United States Patent [19]
Barry

[11] Patent Number: 5,219,261
[45] Date of Patent: Jun. 15, 1993

[54] ROTARY LOADER AND SYSTEM

[76] Inventor: Leonard D. Barry, 19300 Pennington, Detroit, Mich. 48221

[21] Appl. No.: 884,655

[22] Filed: May 15, 1992

Related U.S. Application Data

[63] Continuation-in-part of Ser. No. 518,787, May 4, 1990, abandoned, which is a continuation-in-part of Ser. No. 234,476, Aug. 22, 1988, Pat. No. 4,946,328.

[51] Int. Cl.$^5$ ............................................. B65G 67/02
[52] U.S. Cl. .................................... 414/392; 414/334; 414/337; 414/917
[58] Field of Search ........................ 414/917, 334–338, 414/339–344, 349, 346, 373–374, 390–392, 396, 389, 399, 744 R, 785–786, 787, 401, 362, 584; 104/18–21, 29–31, 49; 212/223, 226

[56] References Cited

U.S. PATENT DOCUMENTS

| | | | |
|---|---|---|---|
| 521,256 | 6/1894 | Browne | 414/917 |
| 4,175,899 | 11/1979 | Tipton | 414/917 |
| 4,362,456 | 12/1982 | Barry | 414/334 |
| 4,370,086 | 1/1983 | Barry | 414/337 |
| 4,483,652 | 11/1984 | Barry | 414/392 |
| 4,548,544 | 10/1985 | Van Appledorn | 414/751 |
| 4,746,257 | 5/1988 | Barry | 414/392 |
| 4,981,410 | 1/1991 | Barry | 414/392 |

FOREIGN PATENT DOCUMENTS

| | | | |
|---|---|---|---|
| 2555676 | 6/1977 | Fed. Rep. of Germany | 212/251 |
| 1-257589 | 10/1989 | Japan | 414/917 |
| 2-65981 | 3/1990 | Japan | 414/917 |
| 1253942 | 2/1986 | U.S.S.R. | 414/917 |

Primary Examiner—Jesús D. Sotelo

[57] ABSTRACT

This is a top-lifting rotary loader and system especially suited for loading and unloading double stacking container well cars. This loader has a self-aligning loadspreader on a crane lift arm extended to revolve around and swing up and down from a vertical column. Each lift arm comprises a first parallelogram linkage with generally horizontally extending links to swing up and down from the column, and a second parallelogram linkage with generally vertical links pivotally attached to the outer lift end of the first linkage and extending to support a loadspreader free to turn thereon. The loadspreader has vertical alignment and coupling rods which turn the loadspreader to align and engage in pockets on the vehicles. A lift cylinder and/or cam track supports the arm to rotate on the column and set and pick up containers. The column can be supported on the ground if vehicles are to be moved past for loading and unloading, or the column and concentric cam track can be supported on a railway truck on a track and the column held vertical by a half-gantry on wheels on a rail parallel that for the railway truck and along the opposite side of a track or driveway for standing vehicle loading and unloading or the column can depend from a traveling gantry especially for the loader to clear over stacked containers. The loadspreader can engage the usual corner castings on the containers or novel automatic hooks especially for models and toys are provided.

16 Claims, 7 Drawing Sheets

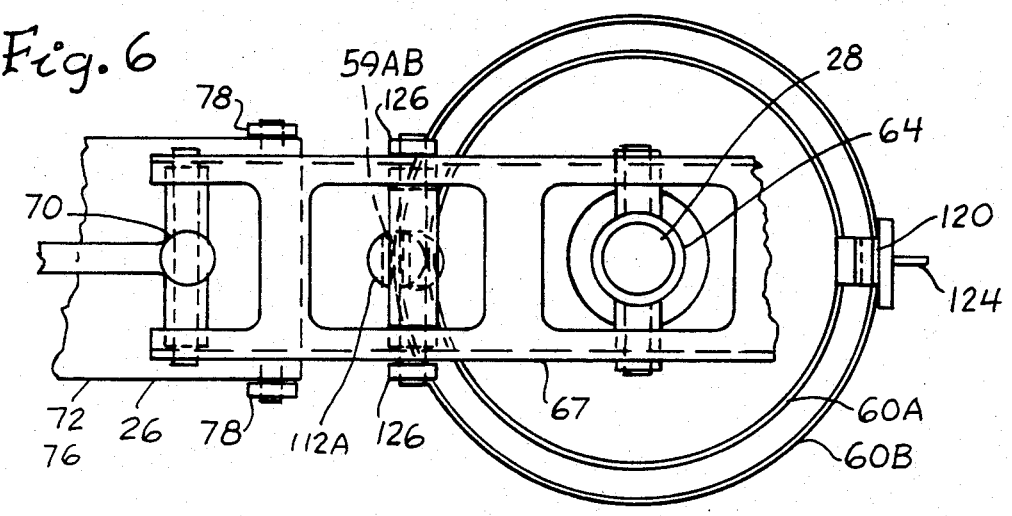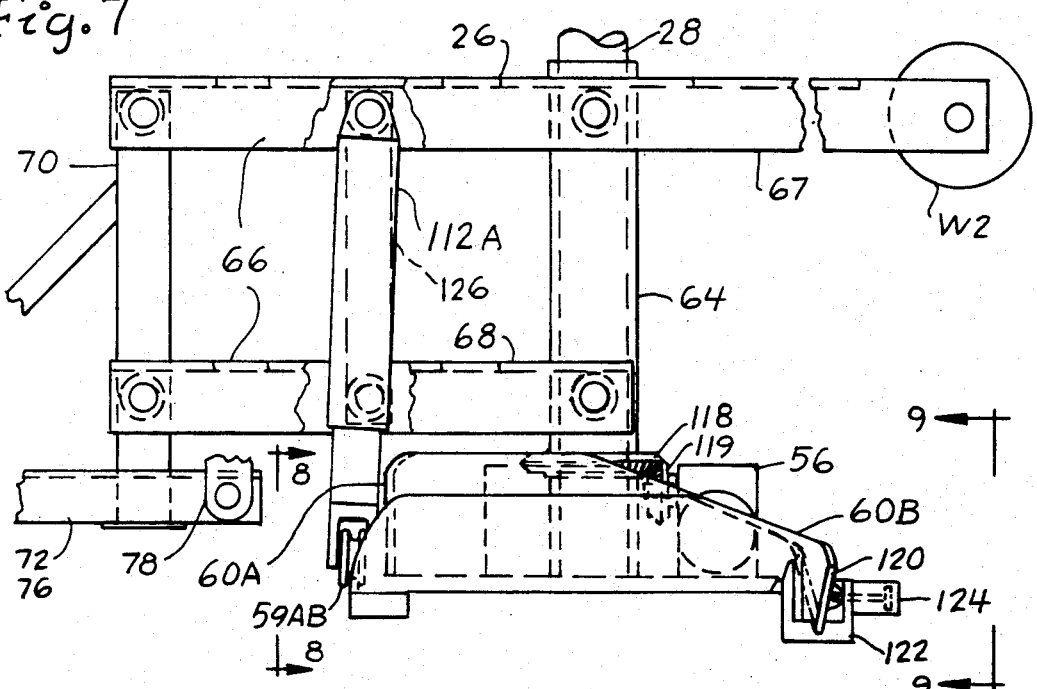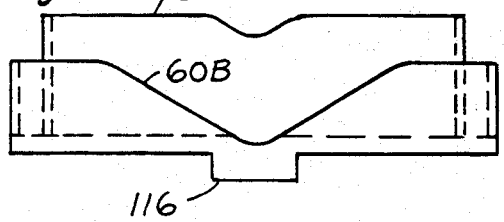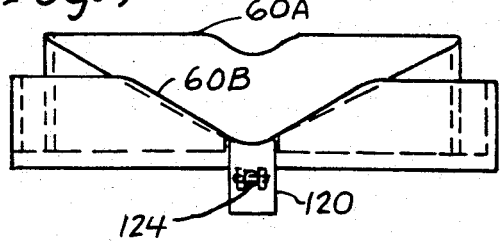

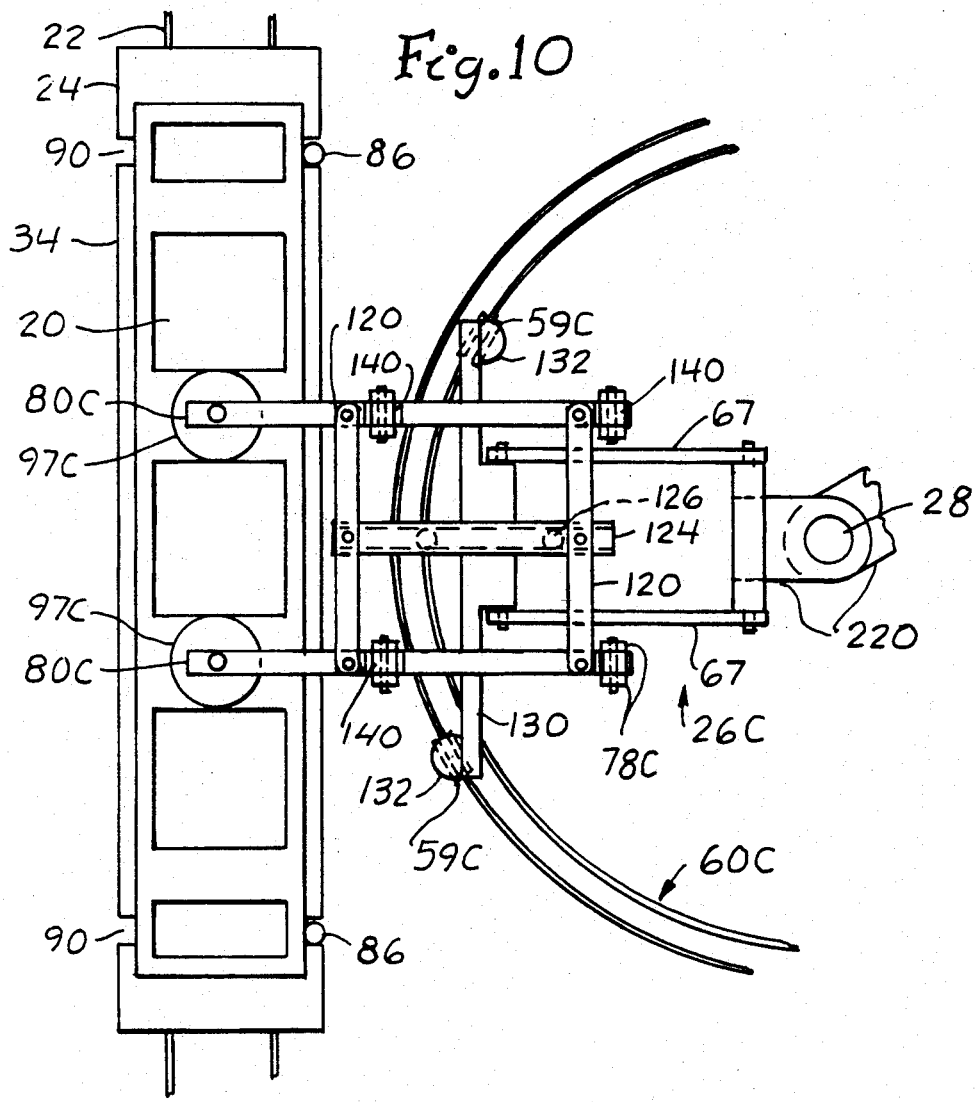
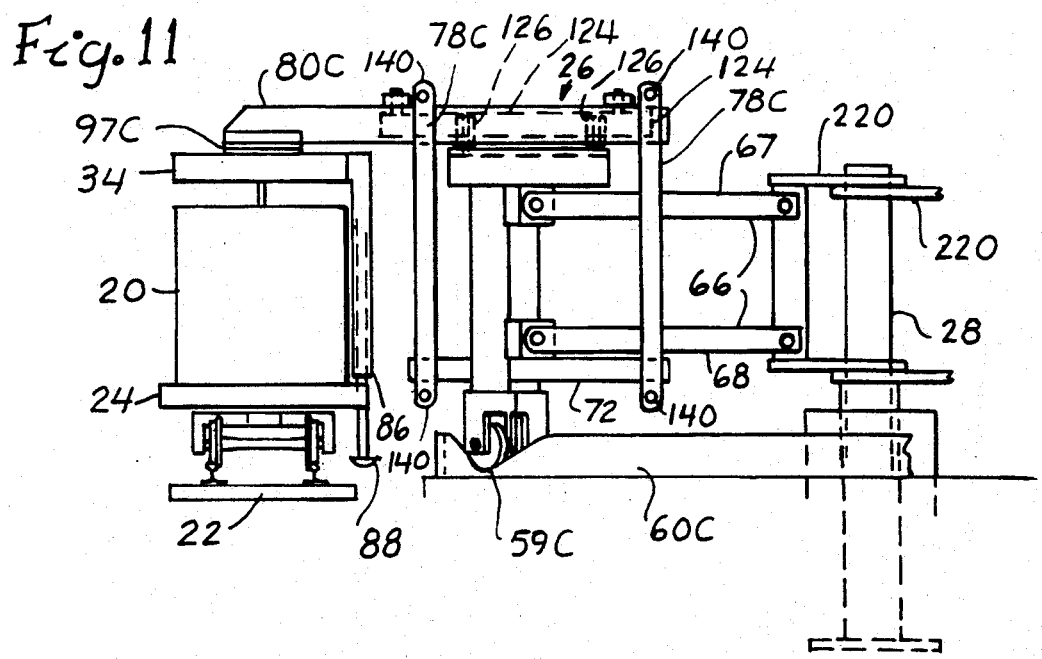

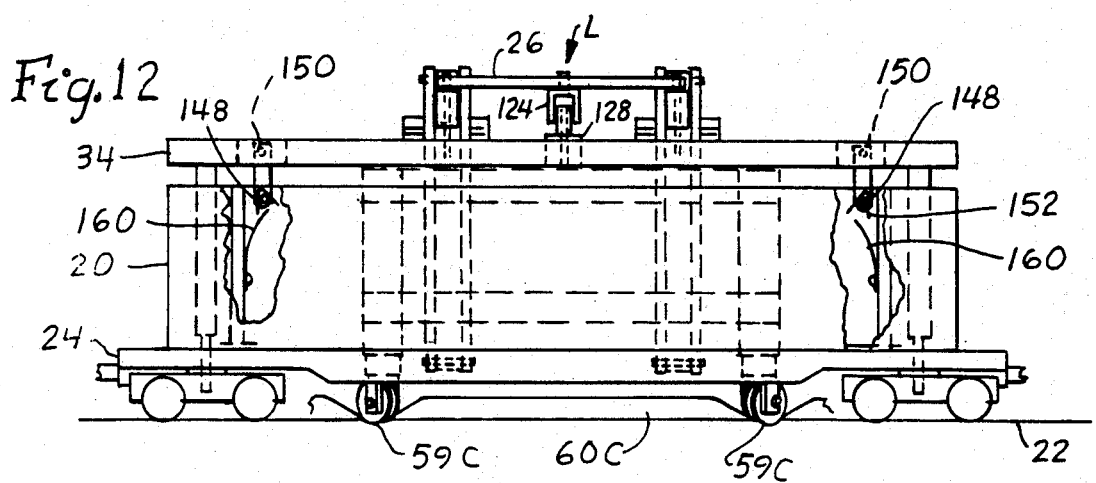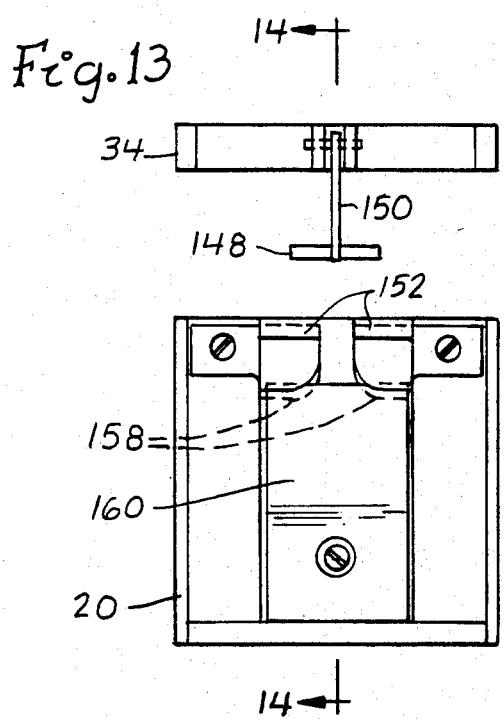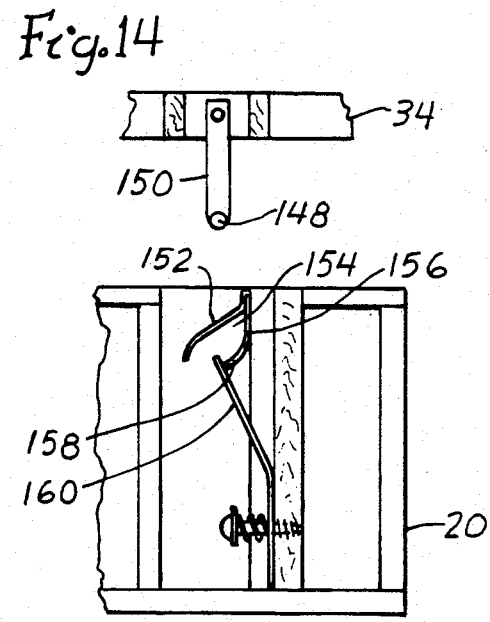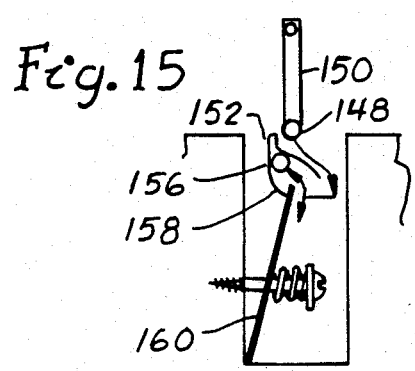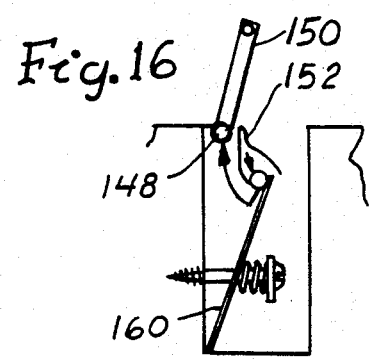

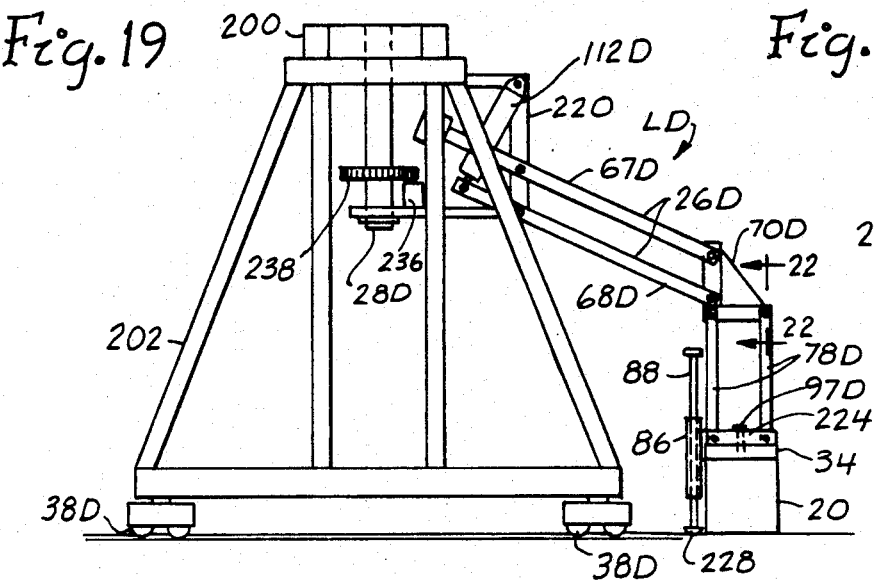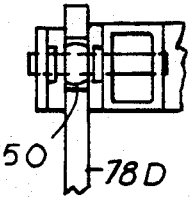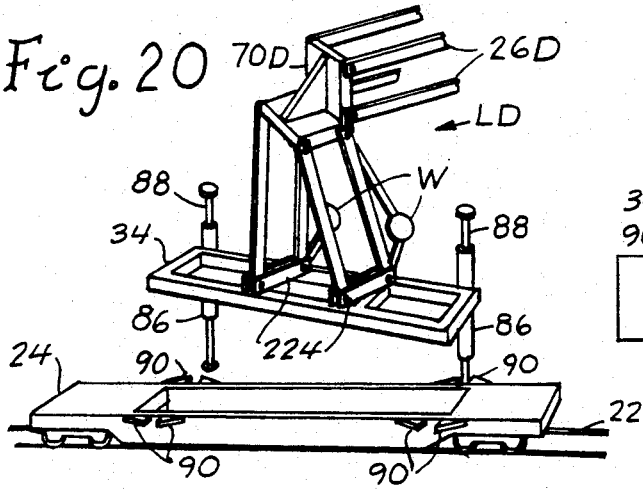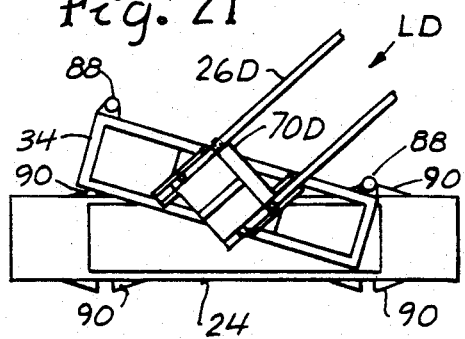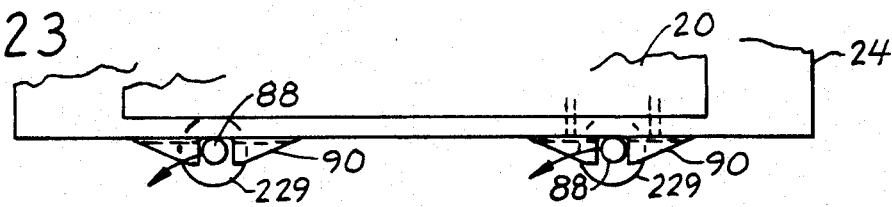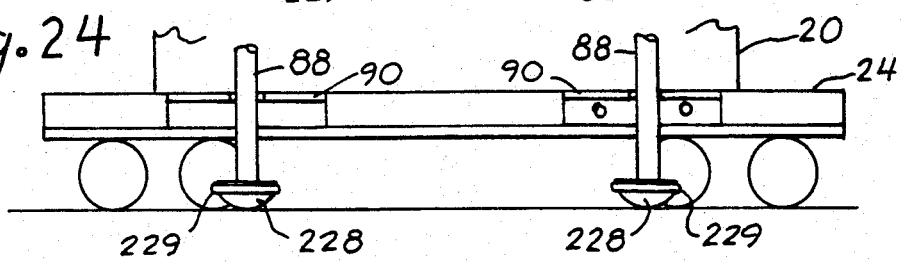

1

ROTARY LOADER AND SYSTEM

CROSS REFERENCE TO RELATED PATENTS

This invention is a continuation in part of my allowed and now abandoned U.S. patent application Ser. No. 07/518,787 filed May 4, 1990, which is a continuation in part of my then pending U.S. patent application Ser. No. 07/234,476, filed Aug. 22, 1988, now U.S. Pat. No. 4,946,328, and is related to my U.S. Pat. Nos. 4,981,410; 4,746,257; 4,370,086 and 4,362,456, and to lesser extent to other of my patents relating to rotary loaders.

It is desired to provide a single-pivot-post rotary loader to top-lift cargo containers to utilize existing flat-bed rail cars and trailers with least modification, to eliminate the need for pedestals or for special depressed-center cars and trailers.

It is further desired to provide a top-lift rotary loader for loading and unloading double-stacked-container well cars.

It is therefore an object of this invention to provide a top-lift rotary loader which lifts and lowers the loadspreader the needed height while substantially level and aligned over the container and vehicle during transfer even if the vehicle is moving.

My prior bottom-lift rotary loaders that have a single pivot post column about which the load arm turns has the load arm hinged at the post end to lift and lower at the outer end to transfer between railway cars and semi-trailers. That tilts the loadspreader as it is lifted and lowered, banking the container thereon during horizontal rotation of the load arm—a desired feature for the bottom lift loader but not suited for top lift for double stacking containers.

It is an object to adapt the swinging links suspension of my referenced pending patent, now U.S. Pat. No. 4,946,328, above stated, to make a swinging links top lift rotary loader which cushions against a vehicle to move therewith in alignment along a chord across the transfer arc and hold the loadspreader substantially level throughout. It is a further object to provide a low-cost, simple, single-pivot-post rotary loader for double stacking and unstacking containers on well cars and on the ground. It is a further object to provide a counter balanced loader. It is desired to provide for this loader to reach and set or pick up containers on the ground. It is desired to keep the wheel load constant independent of the reach of the loader. It is also desired to provide this loader with automatic hooks simple enough to make suitable as a toy. These other and further objects and features should become evident to those skilled in the art by study of this specification with reference to the accompanying drawings wherein:

FIG. 6 is a partial plan view of the pivot column, a portion of the loader, and two cam tracks preferred for loading and unloading well cars as a variation of that part of FIGS. 1-3 to a larger scale.

FIG. 7 is a side view of FIG. 6.

FIGS. 8 and 9 are respectively front and rear views of the cam tracks of FIGS. 6 and 7 taken on lines 8—8 and 9—9 of FIG. 7.

FIGS. 10, 11, and 12 are respectively plan, side, and front views of a simplified loader on a ground mounted pivot column and cam track. The loader is shown engaging a container on a car from the top.

FIGS. 13 and 14 are respectively a transverse section through a model loadspreader aligned over a container and a partial side sectional elevation taken on line 14—14 of FIG. 13 at the container hook.

FIGS. 15 and 16 are diagrammatic side views of the hook of FIGS. 13-14 showing the path of a lifting bar through respectively hooking and unhooking.

Figure 17:
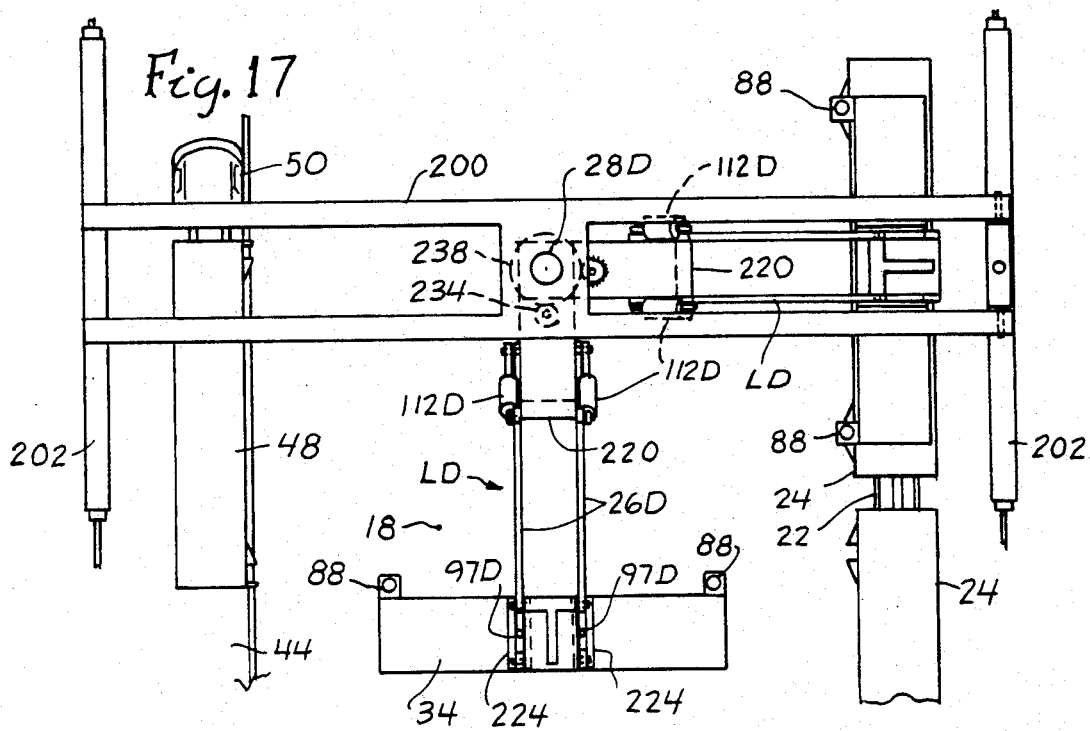
Figure 18:
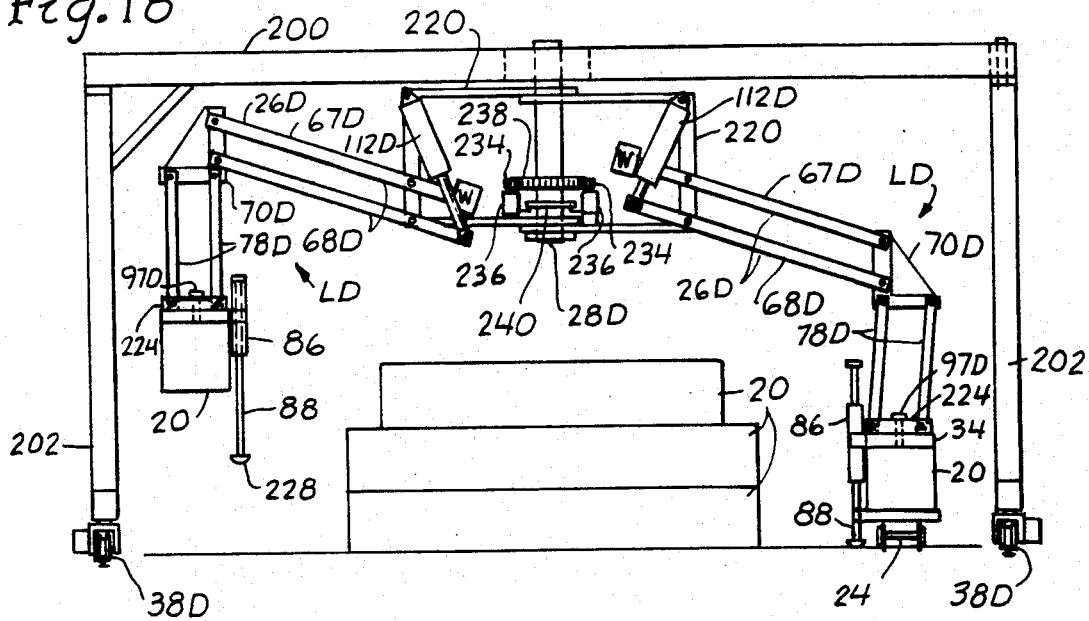

FIGS. 17, 18, and 19 are respectively plan, front, and side views of a portion of a transfer yard with a traveling gantry with two of the rotary loaders modified and adapted to revolve about a column depending from the gantry.

FIGS. 20 and 21 are respectively perspective and plan views of the end of the lift arm of a loader engaging its loadspreader with a vehicle to show how the loadspreader is turned relative to the lift arm.

FIG. 22 is a section through a linkage pin taken on line 22—22 of FIG. 19.

FIGS. 23 and 24 are partial plan and side views of a vehicle with side coupling rods engaged.

Figure 1:
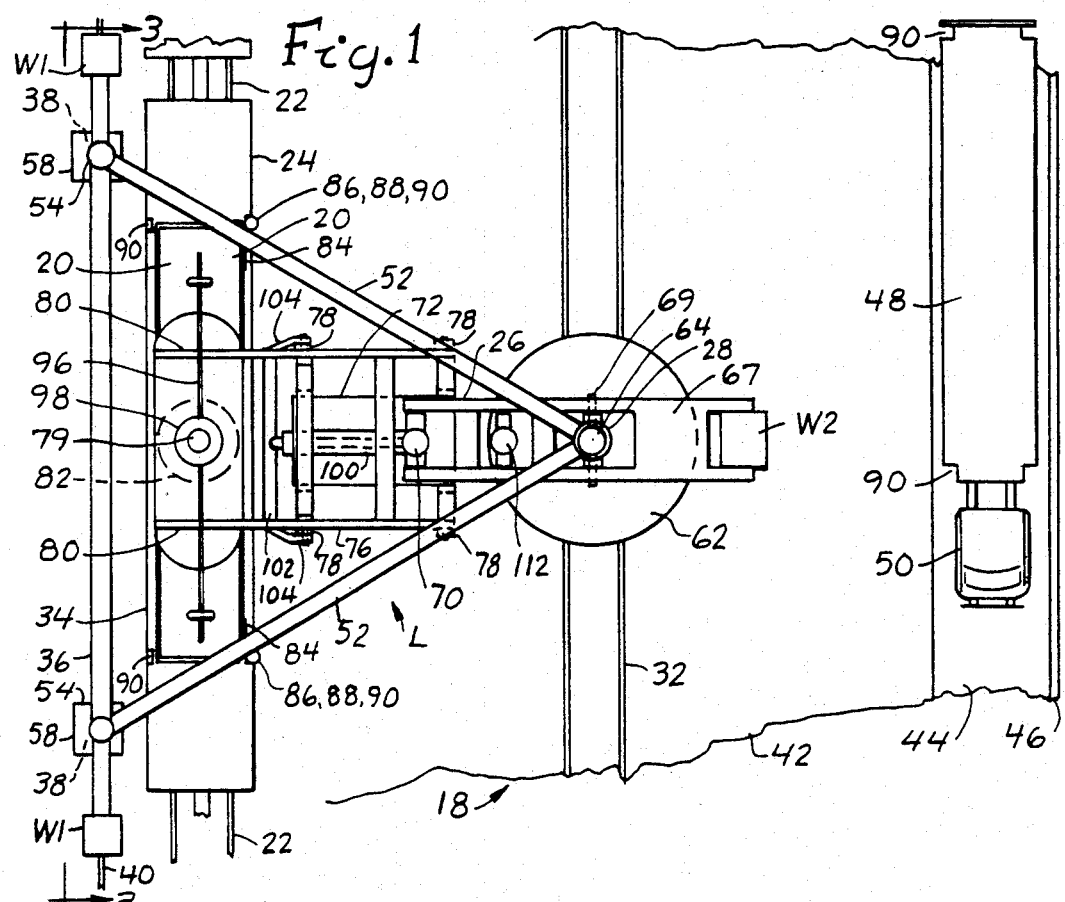
FIG. 1 is a plan view of a portion of a transfer yard having the novel rotary loader transferring a cargo container to or from a railway car and a truck with trailer positioned for receiving the container.
Figure 2:
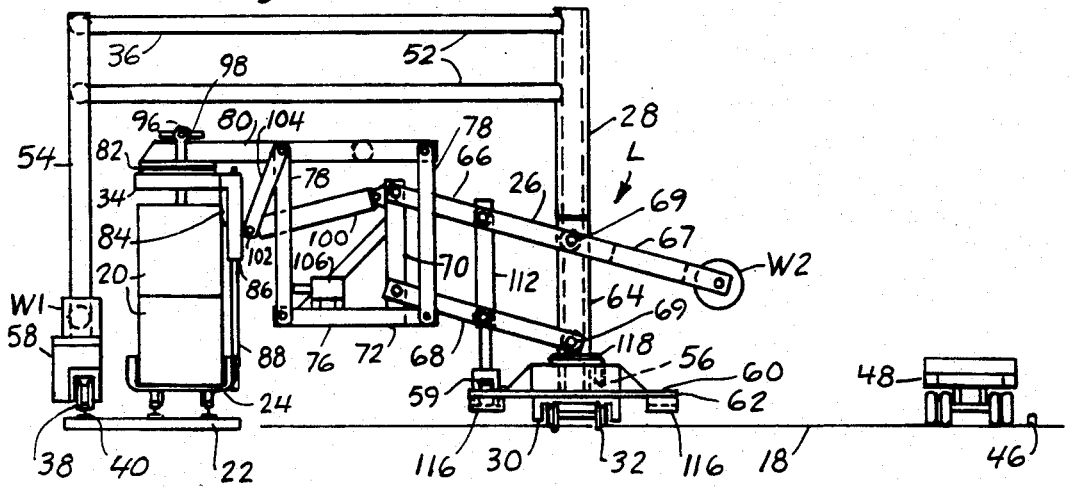
FIG. 2 is a side elevation of FIG. 1.
Figure 3:
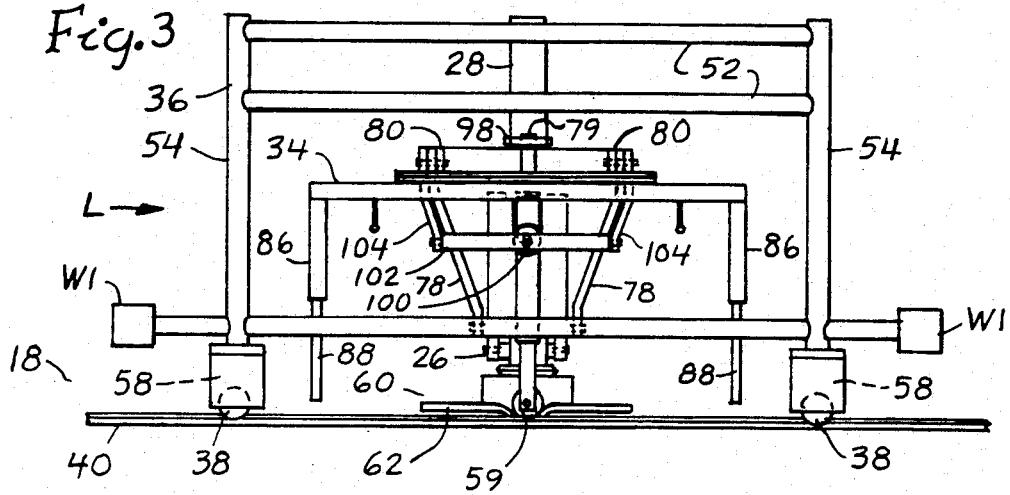
FIG. 3 is a track-side front elevation of the loader taken on line 3—3 of FIG. 1.

Referring to the drawings and in particular to FIGS. 1-3, a transfer yard 18 for cargo containers 20 has a railway track 22 with a cut of container well cars 24 thereon. A double-stacking rotary loader L has a load lift arm 26 mounted to rotate on a vertical column 28. Column 28 is mounted central on a powered railway car truck 30 on track 32 parallel to track 22. A self-aligning loadspreader 34 is mounted on arm 26 to engage and rotate to align over any car 24 along track 22 in yard 18. The loader has a half-gantry 36 that braces column 28 vertical. The gantry is mounted on powered wheels on rail 40 parallel to and on the opposite side of track 22 from track 32 to move along the yard tracks with the loader on the column. A paved area 42 has a driveway 44 marked by lines and curb 46 for flat bed trailer 48 pulled by tractor 50 to position as shown to receive a container 20.

The gantry in plan view has an isosceles or equilateral triangular frame 52 of tubing at two levels spaced apart and supported on two columns 54 over rail 40 and on column 28 over track 32, each column secured to support a corner of the frame 52. The gantry is driven by usual drive motors 56 and 58 and controls to drive all supporting wheels together. The gantry has a weight W1 on each end of a tube connecting columns 54 and extending beyond the frame 52 to counterbalance the loader. All supporting wheels are sprung to help keep the gantry on the track.

The loader has a cam wheel 59 on a circular cam track 60 on disc 62 concentric on column 28 just above truck 30. Load lift arm 26 is mounted on sleeve 64 to rotate on column 28 and be supported on wheel 59 on cam track 60. Lift arm 26 has a first or inner parallelogram linkage 66 comprising sleeve 64, top link 67 and bottom link 68 mounted on pivots 69 on sleeve 64 and to a right-angle bracket or stage 70 at their lifting ends. The stage is a vertical post and a horizontal rectangular member 72 secured to the bottom of the post and braced thereto. A second parallelogram linkage 76 comprises four equal links 78 each pivotally mounted to a corner of said rectangular member 72 and extending up and out to top beams 80 spaced and connected parallel apart and extending outward to a horizontal turntable 82 supporting loadspreader 34 on pin 79. The midsections of links 78 are sloped out to help brace beams 80 from side forces, FIG. 3.

Loadspreader 34 is a rectangular frame with locating tabs 84 to align on container 20 and has two depending alignment sleeves 86 one at each end of the frame 34 on the side facing the loader column. A locating and coupling rod 88 slides up and down in each sleeve and is positioned to engage in a coupling pocket 90 at each end of each container berth on the cars and trailer beds. Rods 88 telescope so as not to interfere with the loader setting a container down on the ground. The usual powered twist locks or other hooking devices on the loadspreader are aligned to engage and hold the container. The loadspreader is turned by engaging it with a car 24, trailer 48, or a container against the restoring force of a straight spring rod 96. Rod 96 extends horizontally through a knob 98 central on top of the turntable and out through an eye on each end of the loadspreader. Knob 98 is normally set to align the loadspreader at right angles to beams 80 for engagement with vehicles. The knob is set (turned) to bias spring rod 96 to turn the loadspreader relative to beams 80 to set the forward end of the loadspreader out to engage the forward coupling rod 88 with a moving car or to set the forward end of the loadspreader in to engage a stationary car or vehicle. This feature reduces the space needed between track 22 and driveway 44; otherwise spring rod 96 would need no adjustment.

Figure 4:
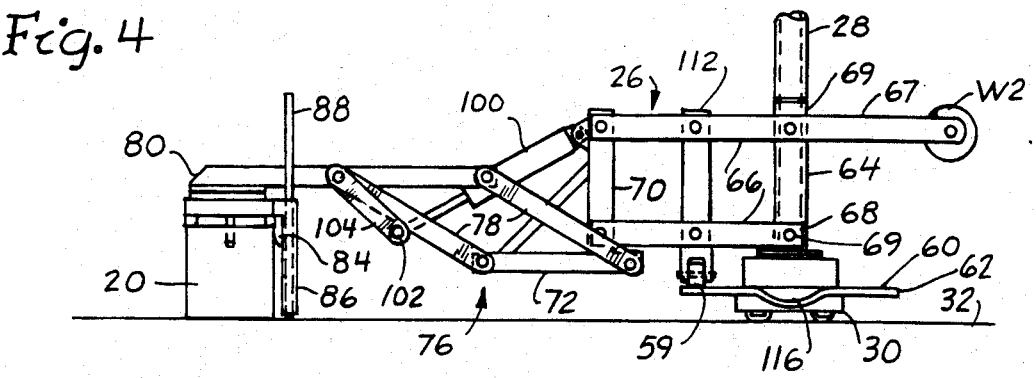
FIG. 4 is a side elevation of the loader's arm on the pivot column in lowered position setting a container on the ground after the loader is rotated 90 degrees.

A hydraulic cylinder 100 on the centerline of the lift arm is pivotally connected between the top of bracket 70 at its head end and the midpoint of a horizontal bar 102 at its rod end beyond the outer links 78 to engage these links and swing up and down to control the outward position of the second linkage. The ends of bar 102 are each connected to and supported by a swinging link 104 connected to the same pivot pin as the outer link 78 on each beam 80. When bar 102 engages the outer links 78 cylinder 100 limits the outward movement of beams 80. When cylinder 100 is extended the outer linkage 76 extends and lowers the loadspreader, as seen in FIG. 4, to set or pick up a container even at ground level. In the position in FIG. 2 the links are pushed in by engagement of the loadspreader with a vehicle to cushion the loadspreader against the vehicle and to follow the chord of an arc over the vehicle to hold close alignment for transfer along this chord across the transfer arc. A spring stop cylinder 106, FIG. 2, helps the linkage to extend after being pushed past vertical position. The weight of cylinder 100 and links 104 and bar 102 also bias links 78 forward at the top. The bottom ends of coupling rods 88 have rounded edges to slide on pavement 42 when a container is set down or picked up that low.

The top link on arm 26 is extended back beyond sleeve 64 to support a counterweight W2 which nearly counterbalances the lift arm and loadspreader. The lift arm is lifted and lowered by cam wheel 59 riding cam track 60. Wheel 59 is mounted on the rod end of a vertical hydraulic cylinder 112 pivotally connected in the first linkage to lift the linkage arm 26 lifting the loadspreader from the lower or well tier position where cylinder 112 is retracted to the top tier position, FIG. 2, where cylinder 112 is extended, or for cars or trailers at different levels, and to lower ram 26 for setting containers on the ground, as in FIG. 4 where cylinder 112 is retracted and cylinder 100 is extended. The cam track 60 has diametrically opposite dip slope pockets 116 into which the cam wheel 59 runs down and up to lower and lift arm 26 for hooks to engage or disengage when cam wheel 59 is near the bottom of the pocket to lift or release the container set down. Optionally a hydraulic cylinder could be connected between sleeve 64 and the end of the top link 67 at weight W2 to replace or supplement the cam wheel lift arrangement.

The loader is rotated about column 28 by beveled gears 118 and 119 driven by motor 56 connected through an electric clutch to release the arm to be rotated by a moving vehicle. Beveled gear 118 is concentrically secured on sleeve 64.

Referring to FIGS. 6–9 for a variation of the cam wheel assembly of FIGS. 1 and 4 for double stack loading and unloading of well cars; this cam track assembly has an inner high cam track 60A for controlling the height of the loadspreader to load and unload the top tier on well cars, and a lower cam track 60B contoured to lift and lower a container in the well of the well car. A switch plate 120 is moved in box 122 with rod 124 of a double acting cylinder to transfer the grooved cam wheel 59AB thereon between the high and low cam tracks at an elevation common to both cam tracks, such as on the back as seen in FIG. 9. Wheel 59AB is mounted on the end of a leg 112A pivotally mounted at the top to the top first link 67 in place of cylinder 112 and so the wheel is free to follow the cam track rails as arm 26 is rotated and lifts and lowers the arm. Preferably auxiliary links 126 connect links 67 and 68 in the first parallelogram linkage to carry the force to be shared by the bottom link 68.

OPERATION

Figure 5:
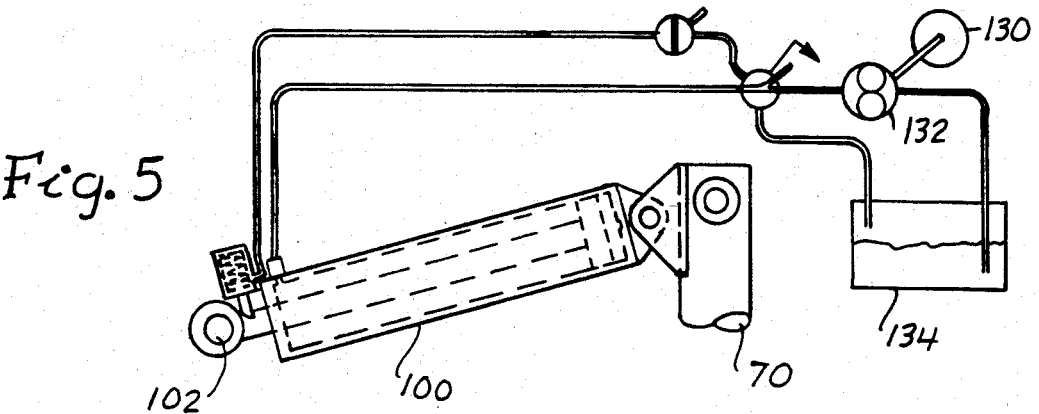
FIG. 5 is a diagram of the lowering and lifting cylinder for setting a container on the ground in lifted position with controls.

A cut of railway cars 24 is spotted on track 22. The loader is preferably radio controlled by a driver in the truck cab or from the ground or a control house added above arm 26 on column 28. Power can be supplied by contact rails run along rail 40 and contacted by brushes on the gantry for driving the motors for wheels 38 and truck 30 and for motor 130. FIG. 5, connected to drive hydraulic pump 132 connecting oil from tank 134 to valves for manual or remote control to operate cylinders as needed. Cylinder 112 is pressured or relieved to set the level of operation, or wheel 59AB is switched onto the correct cam track for the top or bottom tier of containers to be transferred. Knob 98 if needed is set to position the loadspreader's end that faces the vehicle for coupling to be advanced (turned slightly) to where it is easily rotated by engaging the forward coupling rod with the first car in position for transfer. The forward rod 88 slides or rolls along the flat side of car 24 until it enters the forward pocket 90. The cars can be stationary and the gantry driven and/or the cars can be moved by a cable car mover or by the loader if there are few cars, or the cars could already be moving at a speed slower than the loader. With the rod 88 engaged in the forward pocket 90 and the gantry moving back relative to the cars or the cars moving in the opposite direction the loadspreader is rotated and the loader arm turned into alignment for over 30 feet of travel (full scale) in alignment for transfer because the second parallelogram linkage is pushed up slightly and back as needed for the loadspreader to stay in alignment during which transfer can occur. During this time the loadspreader is dipped and lifted by the cam track or by a lift cylinder to engage and lift off the top container. The top tier of containers preferably is removed first and the loader reset and the gantry moved past the cars in reverse to unload the wells. The 30 foot plus of travel in alignment gives a lift slope not to steep for the loadspreader to lower and lift the approximately 4.5 feet on slopes of 0.3 feet/foot. The momentum of the moving gantry or cars and loader helps in lifting.

To load a container onto the trailer bed the trailer is positioned as shown in FIG. 1 relative to the gantry for clockwise rotation of the loader about column 28. The loader is rotated until the forward rod 88 engages in the forward pocket 90 of the trailer. The loader is stopped and its drive unclutched. The trailer is then driven forward to move and turn the loadspreader into alignment and set the container on the trailer either by a lift cylinder or the cam track. The trailers are unloaded and the cars reloaded by the reverse process or a variation thereof. Coupling pockets 90 for the trailer are doweled in slip-fit holes in the trailer and are removed before driving away. The loader remains unclutched until the trailer is driven forward to free the forward coupling rod from the forward pocket and can remain unclutched until the rear coupling pocket should be disengaged.

The containers can be set on the ground beyond the driveway 44 while the gantry is moving and the loadspreader is stationary relative to the ground. Rods 88 of the loadspreader align on curb 46 to turn the loadspreader parallel to the driveway, or the containers can be set in that place or at angles in the paved area while the gantry is stationary and rotation of the loader arm is stopped.

VARIATIONS

Like parts are given the same reference number or a suffix added to distinguish a substantial variation.

The loader arm 26 on pivot column 28 and cam track 60 or 60A and 60B can be mounted on the ground past which the container cars and trailers are moved. FIGS. 10–12 showing a variation of my loader for a fixed location is for handling a single level of containers, but the arrangement equally applies to loader L on column 28 and cam tracks 60 or 60A and 60B for serving both levels of containers on well cars at a fixed location of the loader. This loader is shown with a ground mounted two-rail cam track 60C with spaced cam wheels 59C to ride one on each rail to simultaneously follow transfer dips at transfer alignments.

The turntable is replaced by connecting each beam 80 to the loadspreader to swivel on a turnplate and pivot 97C equally spaced apart endward from the center of the loadspreader. One or two tie links 120 connect beams 80C in a horizontal parallelogram linkage. A central guide channel 124 is pivotally suspended legs down to and central under the tie links. Rollers 126 spaced apart and supported upstanding on top of bracket 128 on top of cross member 130 between legs 132 supporting arm 26C on wheels 59C extend into channel 124 to guide beams 80C central and parallel on the lift arm. This mounting gives the loadspreader more freedom to be rotated by engaging a vehicle or container and a longer arc of transfer than the turntable mounting. Springs or weights not shown extend the linkages with beams 80C outward after transfer, as well as during transfer, which turns the loadspreader to position it on the lift arm for the next engagement. Please see my U.S. Pat. No. 4,981,410 for details of this construction including the double linkage bars 78C connected by equalizer rockers 140 which enable the links 78C to twist and tilt their planes of operation as the beams are brought closer by shifting of them relatively as the loadspreader is pivoted on and between beams 80C.

IMPORTANT FEATURE

The loaders of this invention combine a first and a second parallelogram linkage to keep the loadspreader level and aligned while lifting and lowering especially to keep rods 88 vertical and aligned when engaged with a vehicle, since the height of the loadspreader above the side coupling points would otherwise try to swing the bottom ends of rods 88 out when lifted and push hard on the vehicle—which problem this invention corrects. The loadspreader is supported on the turntable or turnplates and pivot 97-97C so as not to tilt when rods 88 engage.

SUSPENSION BAR AND LIFT HOOKS

The loadspreader for the model loader and suitable for toys etc. has one or more transverse horizontal parallel round bars 148, seen in FIGS. 12–16. Each bar 148 is suspended and secured at their middle on a swinging link 150 such as a wire rope or flat strip mounted to swing lengthwise the loadspreader on each end thereof. Each link 150 is positioned to enter an opening in the top of the container where its bar 148 engages a top slope on two aligned equal hooks 152 spaced apart for the link 150 to enter between for each end of the rod 148 to latch under. The pair of spaced hooks 152 at each end of the container are positioned oppositely to guide bars 148 oppositely either toward or from each other to cancel any engaging forces lengthwise the container. The hooks each have a top pocket 154 for bar 148 to lift in under the top slope, a back wall 156 down therefrom and curving out to a lip 158 under the hook about a third of the way, and a spring tongue 160 closed against the lip and extending up above the lip to trap bar 148 when lowered from the top pocket.

To pick up a container the loadspreader is lowered with bars 148 aligned over hooks 152. When bars 148 engage hooks 152 the swinging links 150 deflect the bars to follow down the top slopes of the hooks. The loadspreader is lowered until bars 148 are below the top lips of the hook Then the swinging links 150 swing between the hooks carrying bars 148 under the hooks. The ends of the hooks facing this gap are tapered from the lips for this entry. When the loadspreader is lifted the container is hooked. When the load is thereafter set down links 150 are lowered and pushed down between the spring closed tongue 160 and the bottom lip 158 on each hook 152 until the force from lowering the loadspreader forces the tongue away from the lip 158 to pass bar 148 below this lip, freeing the tongue to close. When the loadspreader is thereafter lifted the bar follows the bottom surface of the lip to the back face of the hook and up and out from the container.

For double stacking, separate loaders can be used for each tier preferably with one on each side of track 22 at a distance apart with containers presorted for the well and top tier on single deck cars on a track along each side of track 22 at the spacing of driveway 44. More than one lift arm on a column can make continuous loading or unloading of a train of moving cars possible. Bracket 220 in FIGS. 10 and 11 is for this purpose and weights W2 with the extension of links to hold the weights omitted. Plural loaders on a column help balance the loading on the column so weights W2 are less important.

TRAVELING GANTRY MOUNTED LOADERS

Refer to FIGS. 17-19 for a new variation of the rotary loader mounted on a traveling gantry which is able to stack containers 20 on the ground and pass over them. The traveling gantry has a bridge 200 supported on legs or end frames 202 supported on powered wheels 38D which run on parallel rails 40 spaced to span track 22, storage area 18 and driveway 44.

A vertical pivot post or column 28D is secured depending from the bridge 200 to support one or more cranes LD to revolve therearound to load and unload cars 24 and trailers 48 and stack and unstack containers 20 in storage at right angles to the tracks and driveway to better utilize the area and access container stacks from either side by passing over them.

Where more than one loader is mounted to revolve around a column an off-setting bracket 220 is used to separate the loaders by spacing them out from the column. The two loader cranes shown each have a bracket 220 mounted to revolve around on column 28D, a parallelogram crane lift arm 26D of top and bottom parallel link members 67D and 68D pivotally secured on the outer end of bracket 220 and extending to and pivotally supporting a stage or bracket 70D supporting loadspreader 34 on substantially vertical links 78D or cables, two on each side of the arm. The two links 78D supporting each end of the loadspreader are connected at the bottom by a horizontal link 224 pivotally mounted on center by turnplate and vertical pin 97D to the loadspreader to rotate on the loadspreader when these parallelogram linkages supporting opposite ends of the loadspreader are swung oppositely without need of a turntable that is optional. The loadspreader 34 again has the coupling rods 88 which slide in sleeves 86 and extend below to align and side couple the loadspreader to a vehicle. Rods 88 have a bowl 228 or are rounded on the bottom to ride over the paved storage area. The rim of the bowl has a rubber tire 229 to engage the side of the containers on the ground and spaces the coupling rods the correct distance out from the container but which are at ground level and so below the car or trailer bed when the rods are engaged in the coupling pockets of the vehicle. The rods are long enough before being lifted by a pin at the top so sleeves 86 slide up and down on the rods when the loadspreader is lowered and lifted when setting or picking up a container from the ground or the vehicle so the bowls do not lift from the ground during transfer and catch on the vehicle.

Each crane lift arm is lifted and lowered by two lift cylinders 112D pivotally connected head end to the top of bracket 220 and rod end to the inward extension of the lower link 68D one on each side of the lift arm. Each crane can be counterbalanced by a weight W on an inward extension of the top links 67D of the lift arm 26D. Each crane is rotated about column 28D by a spur gear 234 on the output shaft of a reversible gear motor 236 on the offset bracket of that crane, the spur gears 234 engaging a larger spur gear 238 concentrically fixed on column 28D. Electrical contact rings 240 on column 28D are separately connected by brushes to the gearmotor and a hydraulic pump drive motor connected to extend cylinders 112D with usual controls to separately rotate or lift and lower the arm under control of one or more operators.

Links 78D on each side of arm 26D are preferably biased or controlled to extend outward slightly before engaging the coupling rods with a vehicle or containers on the ground by adding springs, cylinders and controls, or weights W as shown in FIG. 20. When the outward extended loadspreader is engaged with a container or vehicle, links 78D swing down to substantially vertical position where lifting is done with less force sideways against the container or vehicle.

Each crane is separately controlled to rotate about column 28D to engage a vehicle as shown in FIGS. 20 and 21. This causes the loadspreader to turn into alignment with the vehicle as its forward coupling rod slides or rolls along a rub-rail or flat surface along the side of the vehicle until engaged in the forward coupling pocket 90 on the vehicle as shown in FIGS. 20 and 21. Links 78D suspending the loadspreader rotate the lower horizontal connecting links 224 relative to the loadspreader to reduce the strain on the linkage and their pins which are preferably in ball joints 250, FIG. 22 or double links and equalizer rockers 140, FIGS. 10 and 11 could be used.

Referring to FIGS. 23 and 24, the centers spacing of coupling rods 88 is slightly farther apart than the coupling pocket centers on the vehicles to free the forward rod when the loadspreader is turned away from a moving vehicle. The other crane or cranes mounted on the column can follow to engage the next car as the cars are moved slowly past the gantry or the gantry can be moved to load stationary or moving cars. The loadspreader is turned over the end areas to clear over stacked containers, FIG. 18, or the coupling rods could be power lifted.

As seen in FIG. 24, the coupling pockets 90 along the sides of the vehicles are vertically shallow and rounded where engaged in by the coupling rods, so if the coupling rods are moved out of a vertical position by pushing or being pushed along with the vehicle they are less likely to bind than a taller contact face engagement. The coupling pockets are preferably positioned along the highest edge of the sides of the vehicles but could be set low on light weight vehicles to prevent or reduce tipping of the vehicles by the loader.

Having thus described my loader and modifications and adaptations of it, it is understood that various loaders, features, and applications come or can come within the spirit and scope of this invention, I therefore do not wish to be limited to the embodiments disclosed herein but desire full coverage of this invention with the appended claims.

I claim as my invention:

1. A rotary loader for transferring cargo containers to and from vehicles in which the loader in addition to having a vertical pivot column, a circular cam track about said column, a lift arm comprising a first parallelogram linkage frame mounted to revolve about said column and having top and bottom parallel links extending out from said column to lift and lower the load and a vertical member connecting the outer lift ends of said links away from the column, cam wheel means supporting the load lifting ends of said links on said cam track, the improvement comprising: a second parallelogram linkage frame having a horizontal stage member secured to said vertical member, a top member and second parallel links extending from said stage up to said top member, said top member having an extension out beyond said second parallel links, a turntable and top lifting loadspreader thereon supported from said extension to rotate to align over a load, and means for aligning said loadspreader over a vehicle and moving along the chord of an arc of turning of said arm in alignment over the vehicle, and means for lowering and lifting said arm to move said loadspreader down and up level within an arc of turning of said arm for transfer of a container to or from the vehicle.

2. A loader as in claim 1, first rail and wheel means for supporting said column and said cam track thereon, a half-gantry bracing said column vertical, second rail and wheel means supporting said half-gantry to move the gantry parallel to said first rail means.

3. A loader as in claim 2, said half-gantry having a triangular frame, said column supporting one corner of said frame and at least one gantry column supporting each other corner of said triangular frame.

4. A loader as in claim 3 and an extension member extending out from each gantry column in a line below said frame, a counter weight on each outer end of each said extension member.

5. A loader as in claim 1, said first parallelogram linkage frame having at least one of said parallel links having a back extension extending back past said column a substantial ways and a counter-weight on said back extension to counterbalance said arm, loadspreader and turntable.

6. A loader as in claim 1, said cam wheel means including a link connecting said top and bottom parallel links intermediate their ends to carry the lifting force on both of said links.

7. A loader as in claim 6, said cam wheel means including said link being a hydraulic cylinder having a depending rod and a cam wheel on the end of the rod of said cylinder for varying the lift height of said arm.

8. A loader as in claim 1 and a cylinder pivotally mounted to depend from its head end pivotally secured to said top parallel link so as to swing in a plane parallel with said first linkage frame, said cam wheel means being a grooved wheel on the bottom of the depending rod end of said cylinder positioned for running on said cam track, said cam track having two concentric runs for lifting and lowering said loadspreader, a high one for placing or lifting a container from on top of another container and a low one for placing or lifting a container next below, and switching means for transferring said wheel between said runs.

9. A loader as in claim 8, said low run being for placing or lifting a container from the well of a well car.

10. A loader as in claim 1 and hydraulic cylinder means pivotally mounted extending forward from said vertical member, a cross member connected to the rod end of said cylinder and a link connecting each end of said cross member to said top member in front of said second parallel links to engage said links to limit their forward movement and pressure means to operate said cylinder to lower and lift said second parallel linkage frame to set or lift a container on the ground.

11. A loader as in claim 1, said second parallel links being similarly formed to slope mid-section to brace said top member sidewise.

12. In a rotary loader having at least one loadspreader activated to engage against the side of a vehicle to move for aligning the loadspreader with the vehicle when moved for transfer of a load between the loader and the vehicle and to lift or lower the load for transfer, at least one rotary load support arm mounted to describe a horizontal arc in and out over a path that the vehicle moves for transfer, vertical locating members depending from said loadspreader and support means pivotally connected to said loadspreader for supporting and turning said loadspreader to rotate horizontally to align for transfer, the improvement comprising: a plurality of parallel and free-swinging substantially vertical links spaced longitudinally along said support arm and connecting said support means to said support arm to form a parallelogram linkage to support said loadspreader to swing in and out along said support arm and swing in when said loadspreader is brought against said vehicle to cushion against the vehicle and to allow the loadspreader to follow a chord across an arc along which transfer is made to closely align the loadspreader with the vehicle throughout the arc.

13. In a loader as in claim 12 said links carrying forces from a moving vehicle to rotate the loader in alignment therewith in said arc.

14. A traveling gantry crane having a bridge for spanning a container storage and transfer yard, a depending vertical column on said bridge, at least one loader having a parallelogram crane lift arm mounted to rotate about said column above said yard, an overhead loadspreader for the containers, telescoping vertical coupling rods on said loadspreader for aligning and coupling said loadspreader with a vehicle and linkage and swivel means for suspending said loadspreader horizontally from said arm to turn into alignment when engaging the vehicle through an arc of turning for transfer.

15. A loader as in claim 14, said coupling rods having a rubbertired dish on the bottom for movement over the yard and to align a container on the ground.

16. A loader as in claim 14 and coupling pockets for side-coupling with said vehicle said rods, said pockets being doweled to the vehicle to slip fit in holes in the vehicle for quick and easy removal.

* * * * *